(12) United States Patent
Jenko

(10) Patent No.: US 6,220,851 B1
(45) Date of Patent: Apr. 24, 2001

(54) DETACHABLE NOZZLE BODY

(75) Inventor: Edward J. Jenko, Essex Junction, VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/294,241

(22) Filed: Apr. 19, 1999

(51) Int. Cl.[7] .................................................. B29C 45/20
(52) U.S. Cl. ....................................... 425/549; 264/328.15
(58) Field of Search ........................ 425/549; 264/328.15

(56) References Cited

U.S. PATENT DOCUMENTS

| | | |
|---|---|---|
| 3,295,169 | 1/1967 | Moslo . |
| 3,553,788 | 1/1971 | Putkowski . |
| 4,095,931 | 6/1978 | Reitan . |
| 4,303,169 | 12/1981 | Grey . |
| 4,768,945 | * 9/1988 | Schmidt et al. ................ 425/549 |
| 5,374,182 | 12/1994 | Gessner . |
| 5,533,882 | 7/1996 | Gessner et al. . |
| 6,079,971 | * 6/2000 | Ramond ........................ 425/549 |

* cited by examiner

Primary Examiner—Tim Heitbrink
(74) Attorney, Agent, or Firm—Bachman & LaPointe, P.C.

(57) ABSTRACT

An apparatus and process for injecting molten plastic material includes a nozzle assembly through which plastic material flows and including a nozzle body with a heater affixed thereto. A mold cavity plate is positioned adjacent the nozzle body and is separable from the nozzle body so that separation of the mold cavity plate from the nozzle body exposes the nozzle body and permits removal of the nozzle body and the heater.

11 Claims, 5 Drawing Sheets

DETACHABLE NOZZLE BODY

BACKGROUND OF THE INVENTION

The present invention relates to an apparatus and process for injection molding plastic material and particularly a nozzle assembly used in a hot runner assembly system and through which plastic material flows.

Typical hot runner nozzle assemblies include a nozzle body that has a heater in heat exchange relationship with respect thereto. It is generally necessary to disassemble the mold in order to replace or repair the heaters. This represents a time consuming and expensive procedure. Fast and easy serviceability are highly desirable in these systems.

The present invention provides an improved system and process which permits the convenient removal and replacement or repair of the nozzle body and heater without disassembly of the mold.

U.S. Pat. No. 5,374,182 to Gessner shows a nozzle assembly with a heater clamped to the exterior of the nozzle housing and providing a means for replacing the heater. The mold plate is latched over in the molding machine, thereby permitting exposure of the heater and providing access for its removal from the nozzle body.

U.S. Pat. No. 4,768,945 to Schmidt shows a nozzle assembly having a heater embedded into the nozzle body. It is well known that during the operation of the injection mold the nozzle heater may burn out. However, in order to replace the heater by removing the nozzle body so that a new heater can be installed, the mold must be disassembled so that the entire nozzle assembly can be removed. This is a time consuming and costly process which severely impacts the productivity of the mold.

U.S. Pat. No. 3,553,788 to Putkowski uses a hot runner nozzle assembly with a nozzle body that has a sliding fit connection to the hot runner manifold and the gate pad. The housing has an external heater clamped to its exterior. The sliding fit is designed to accommodate thermal expansion of the nozzle body as it is heated. The design relies on the sliding fit not leaking plastic when subjected to high plastic injection pressure inside the melt channel. However, replacement of the heater without dismantling the mold is difficult because the heater wiring is routed via the air space surrounding the hot runner manifold and is not accessible by removal of the cavity plate. Furthermore, sliding fit style hot runners tend to leak plastic when pressurized.

U.S. Pat. No. 4,095,931 shows a hot runner nozzle assembly with a heated nozzle assembly wherein both an outer sheath and an inner sleeve can be removed by unthreading them from the nozzle header and thereby exposing the heater. However, the wiring to the heater is routed through the nozzle header making it difficult to replace the heater without the expense and inconvenience of dismantling more of the nozzle assembly.

U.S. Pat. No. 3,295,169 to Moslo shows a heated machine nozzle with heaters clamped externally to a threaded, removable outer nozzle sleeve. There is no teaching of how this nozzle could be incorporated in a mold structure. In addition, these heaters do not transfer heat as efficiently as an integral heating element. Also, positioning of the heater in tight spaces can be a problem as they tend to be bulky.

U.S. Pat. No. 4,303,169 shows a nozzle tip portion which is screwed onto a heated body. An insulating bushing centrally locates the nozzle in the mold plate. However, in order to remove the heated portion, or even the nozzle tip, the mold plate must be disassembled from the hot runner.

Accordingly, it is a principal object of the present invention to provide an improved apparatus and method including a nozzle assembly with a nozzle body and heating means wherein the nozzle body and heating means may be simply, conveniently and expeditiously removed for replacement or repair of the heating means.

Further objects and advantages of the present invention will appear hereinbelow.

SUMMARY OF THE INVENTION

In accordance with the present invention, the foregoing objects and advantages are readily obtained.

An apparatus for injection molding plastic material is provided in accordance with the present invention, which comprises: a nozzle assembly through which plastic material flows, said nozzle assembly including a removable nozzle body with a forward end portion, a rearward end portion and a nozzle channel therein through which said plastic material flows; heating means affixed to the nozzle body and generally embedded therein; a mold cavity plate adjacent said forward end portion and separable from the forward end portion; wherein separation of the mold cavity plate from the forward end portion of the nozzle body exposes the forward end portion and heating means and permits removal of the nozzle body and heating means from the nozzle assembly. A nozzle header is generally provided engaging the rearward end portion of the nozzle body, wherein the nozzle body is removable from the nozzle header.

In accordance with the process of the present invention, a nozzle assembly is provided through which plastic material flows, said nozzle assembly including a removable nozzle body with a forward end portion, a rearward end portion and a nozzle channel therein through which plastic material flows; affixing heating means to the nozzle body and generally embedding the heating means in the nozzle body; positioning a mold cavity plate adjacent the forward end portion of the nozzle body, wherein the mold cavity plate is separable from the forward end portion; separating the mold cavity plate from the forward end portion of the nozzle body to expose said forward end portion and said heating means and permit removal of the nozzle body and heating means from the nozzle assembly.

Further features of the present invention and advantages of the present invention will appear hereinbelow.

BRIEF DESCRIPTION OF THE DRAWINGS

The present invention will be more readily understandable from a consideration of the accompanying, illustrative drawings, wherein.

DETAILED DESCRIPTION OF PREFERRED EMBODIMENTS

Figure 1:
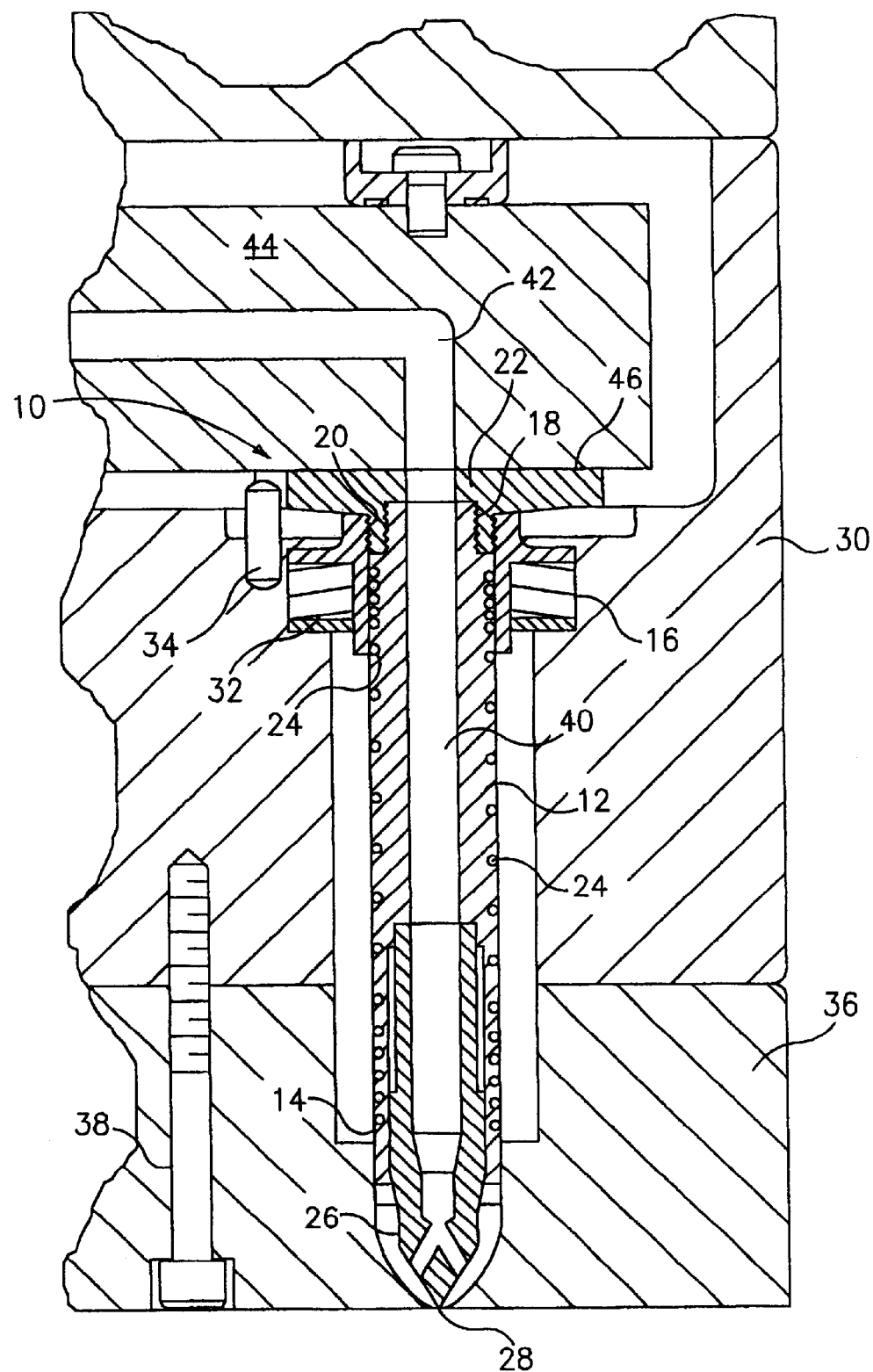
FIG. 1 is a sectional view through a nozzle assembly of the present invention.

FIG. 1 shows a nozzle assembly 10 of the present invention including a nozzle body 12 having a forward end portion 14 and a rearward end portion 16. The rearward end portion includes threads 18 for threadably engaging corresponding threads 20 on nozzle header 22 to fix nozzle body 12 in place in the nozzle assembly. The nozzle body includes a heater 24 embedded therein with wiring thereto wired to be accessible when the forward end portion 14 of the nozzle body 12 is exposed as will be shown in subsequent embodiments. Nozzle tip 26 having a tip end 28 is threaded into the forward end portion of the nozzle body. FIG. 1 shows the nozzle header 22 spaced from the manifold plate 30 by spring means 32 and located by dowel 34 to prevent rotation of the header when the nozzle body is threaded into the header. Mold cavity plate 36 is positioned adjacent the forward end portion 14 of nozzle body 12. Mold cavity plate 36 is separable from the forward end portion 14 of the nozzle body by any desired and convenient means, as by screw 38 or a plurality of such screws. The nozzle body also includes a nozzle channel 40 therein through which plastic material flows to a mold (not shown) from a manifold channel 42 in a hot runner manifold 44, all in a conventional manner.

In accordance with the embodiment of FIG. 1, the nozzle body 12 fastens to nozzle header 22 and seals at the interface between the nozzle body and header. This permits one to make the header out of a hard and durable material suitable to withstand the sliding wear at the interface 46 between the manifold and header. Additionally, the header could be made of a material of low thermal conductivity, such as titanium, so that it will not transfer heat away from the nozzle or manifold to the adjoining manifold plate. The nozzle body may be made of a thermally conductive material, such as beryllium copper, carbide or any suitable tool steel.

Thus, in accordance with the embodiment of FIG. 1, the mold cavity plate 36 is separated from the forward end portion 14 of the nozzle body 12 as by disengaging screw 38, when the mold is spaced from the nozzle assembly. This permits the easy and convenient removal of the nozzle body and heater from the nozzle assembly for repair or replacement of the heater.

Figure 2:
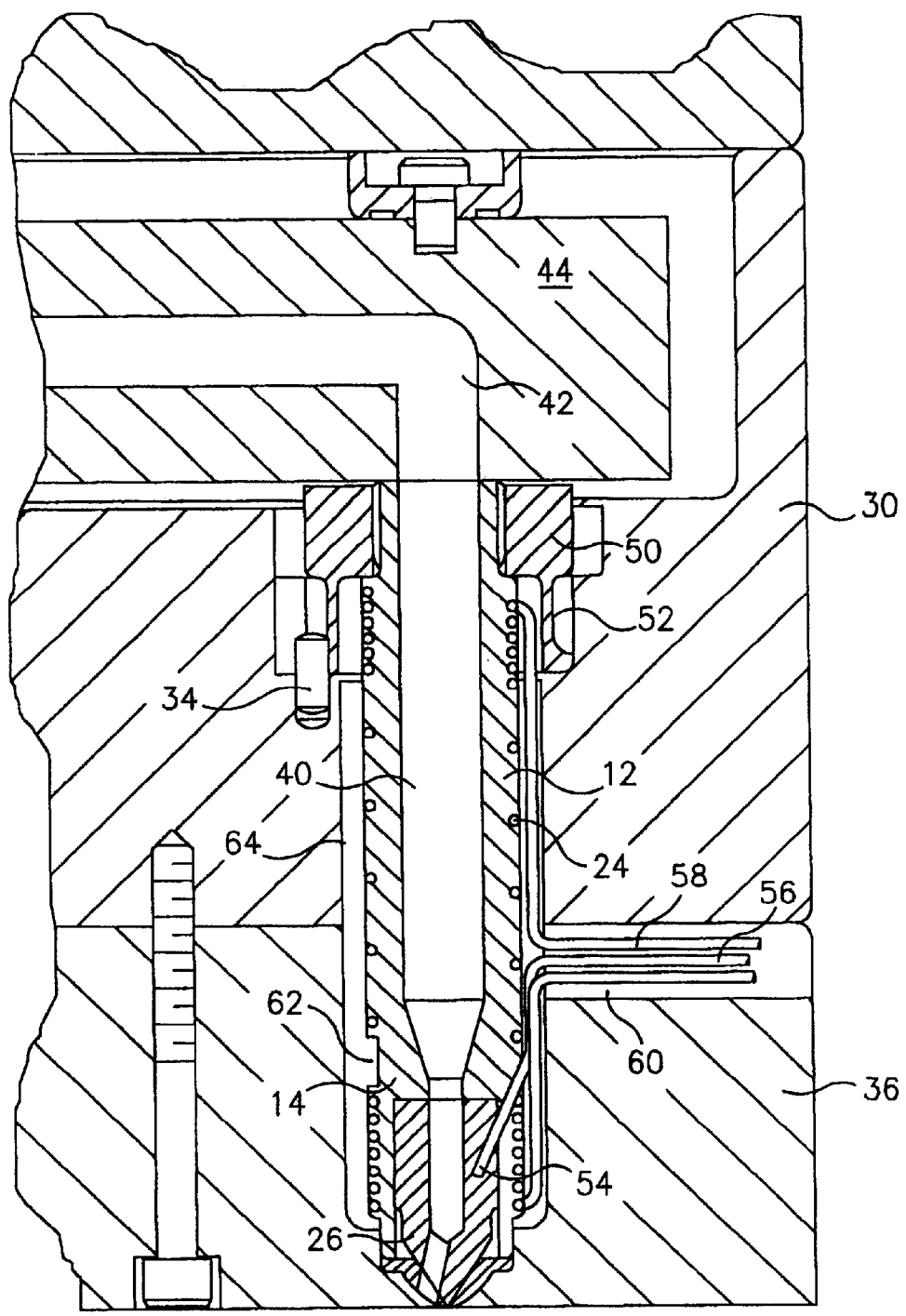
FIG. 2 is a sectional view through a preferred embodiment of a nozzle assembly of the present invention.

The preferred embodiment of FIG. 2 shows a nozzle header 50 spaced from manifold plate 30 by annular insulating sleeve 52. The nozzle body 12 is threaded through the nozzle header 50 so that the nozzle body seals directly against the manifold 44, thereby eliminating the need for a second sealing surface as shown in FIG. 1. The threaded connection between the nozzle body and header causes the header to push the nozzle body into sealing relationship with the manifold. FIG. 2 also shows a thermocouple 54 with its associated wiring 56 that may also be embedded in the nozzle body. Heater 24 also includes its associated heater wiring 58. Thermocouple and heater wiring extend in channel or groove 60 which is machined in the manifold plate. To remove the nozzle body, the flexible heater and thermocouple wires can be bent up and out of the groove to allow rotation of the nozzle body without damage to the wires. Alternatively, the groove can be machined in the cavity plate (as shown in FIG. 2) so that the wiring is free to rotate as the nozzle body is unthreaded and is readily accessible upon removal or unlatching of mold cavity plate 36, along with the easy accessibility of the nozzle body, heater and thermocouple. Wrench flat 62 or other suitable means is provided on the nozzle body for engagement with a suitable tool to permit tightening or loosening of the nozzle body's threaded engagement in the nozzle assembly.

During operation, the manifold 44 slides across its interface with the nozzle body 12 due to thermal expansion of the manifold. The nozzle header or insulating collar 50 locates the nozzle body in its desired position in the manifold plate 30 and maintains its centered position while the manifold slides across the nozzle body. The nozzle header also serves to push the nozzle body against the manifold to maintain plastic sealing forces at the interface between the nozzle body channel 40 and manifold channel 42. The nozzle body can be assembled to the header before placing the nozzle into the manifold plate bore 64 or it can be assembled from the opposing side of the manifold plate 30. Once the mold is in production if a heater fails on the nozzle body the mold cavity plate can be easily removed or spaced away from the nozzle body exposing the forward end portion 14 of the nozzle body. The nozzle body can then be easily disassembled from the nozzle assembly without having to disassemble the manifold and manifold plate. The advantageous integral heater and nozzle body can then be conveniently removed without additional disassembly of the hot runner system.

Figure 3:
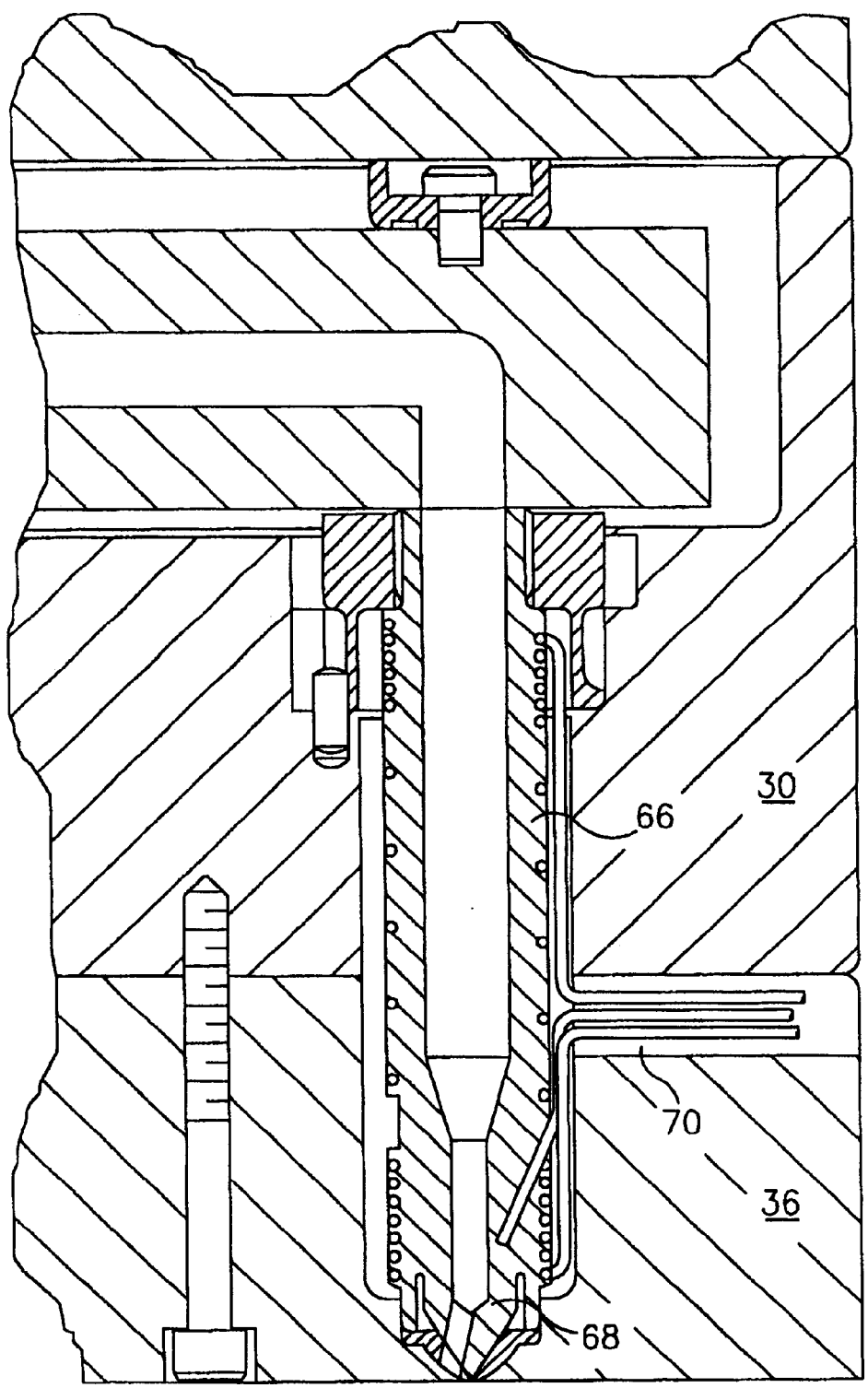
FIG. 3 is a sectional view of an alternate embodiment of the nozzle assembly of the present invention.

As shown in FIGS. 1 and 2, the nozzle tip 26 is constructed as a separate piece detachable from the nozzle body, which can be done in the construction of the present invention. This is done heretofore because the nozzle tip 26 is subject to wear and damage especially at nozzle tip end 28. Threading the nozzle tip into the nozzle body enables replacement of the nozzle tip without replacing the nozzle body; however, this has the disadvantage of making the nozzle tip weaker than if it was an integral part of the nozzle body. In accordance with the present invention, the nozzle tip portion can be made stronger and easy to service if it is permanently fixed to the nozzle body, as for example shown in FIG. 2 as by brazing, or as shown in FIG. 3 by making the nozzle body 66 and nozzle tip 68 integral. Also, in accordance with the embodiment of FIG. 3, wiring channel 70 is located between mold cavity plate 36 and manifold plate 30 and is readily accessible upon removal or unlatching of the mold cavity plate.

Figure 4A:
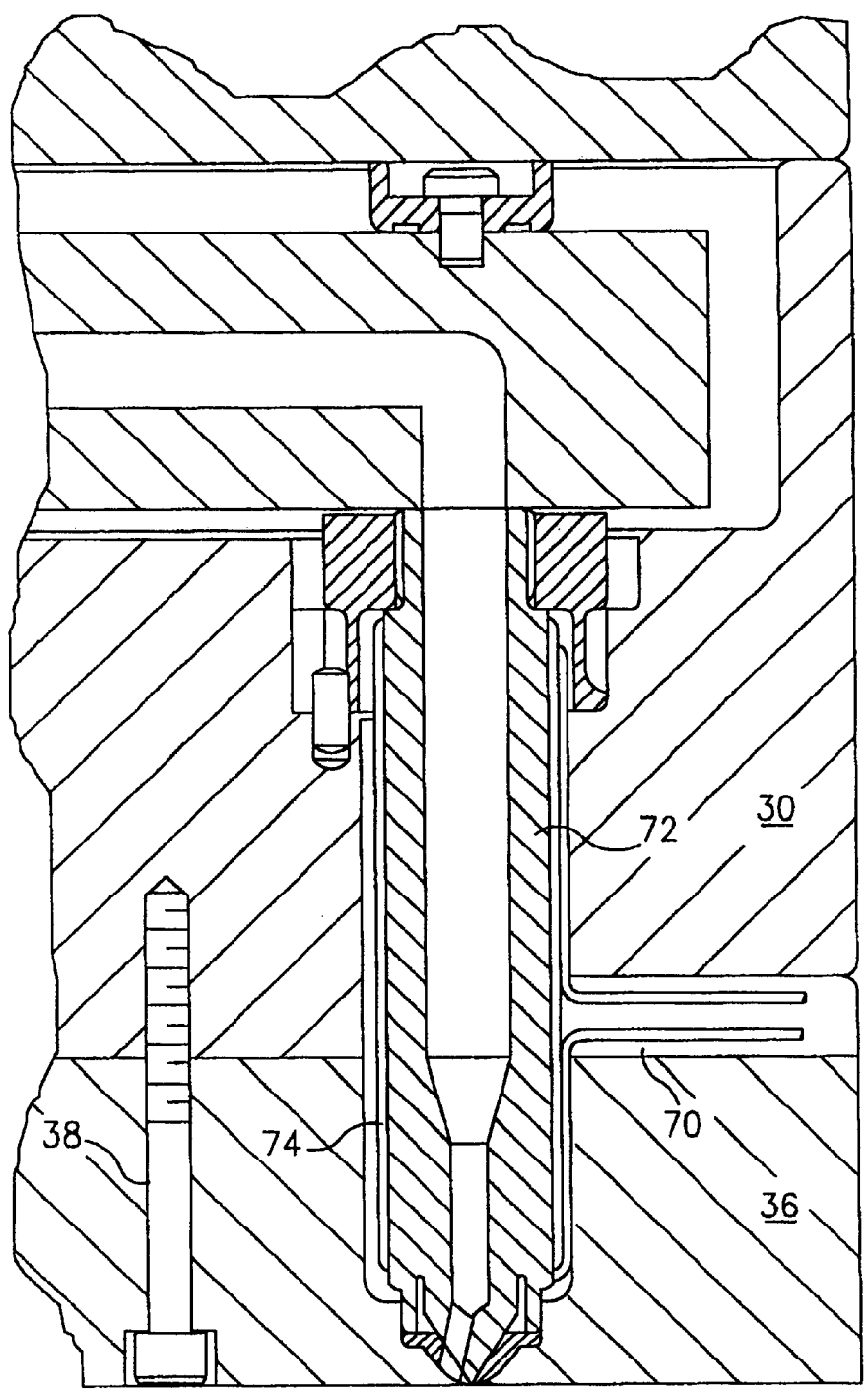
FIGS. 4A and 4B are sectional views of a further embodiment of the nozzle assembly of the present invention, with FIG. 4A showing the complete nozzle assembly and FIG. 4B showing the mold cavity plate removed.
Figure 4B:
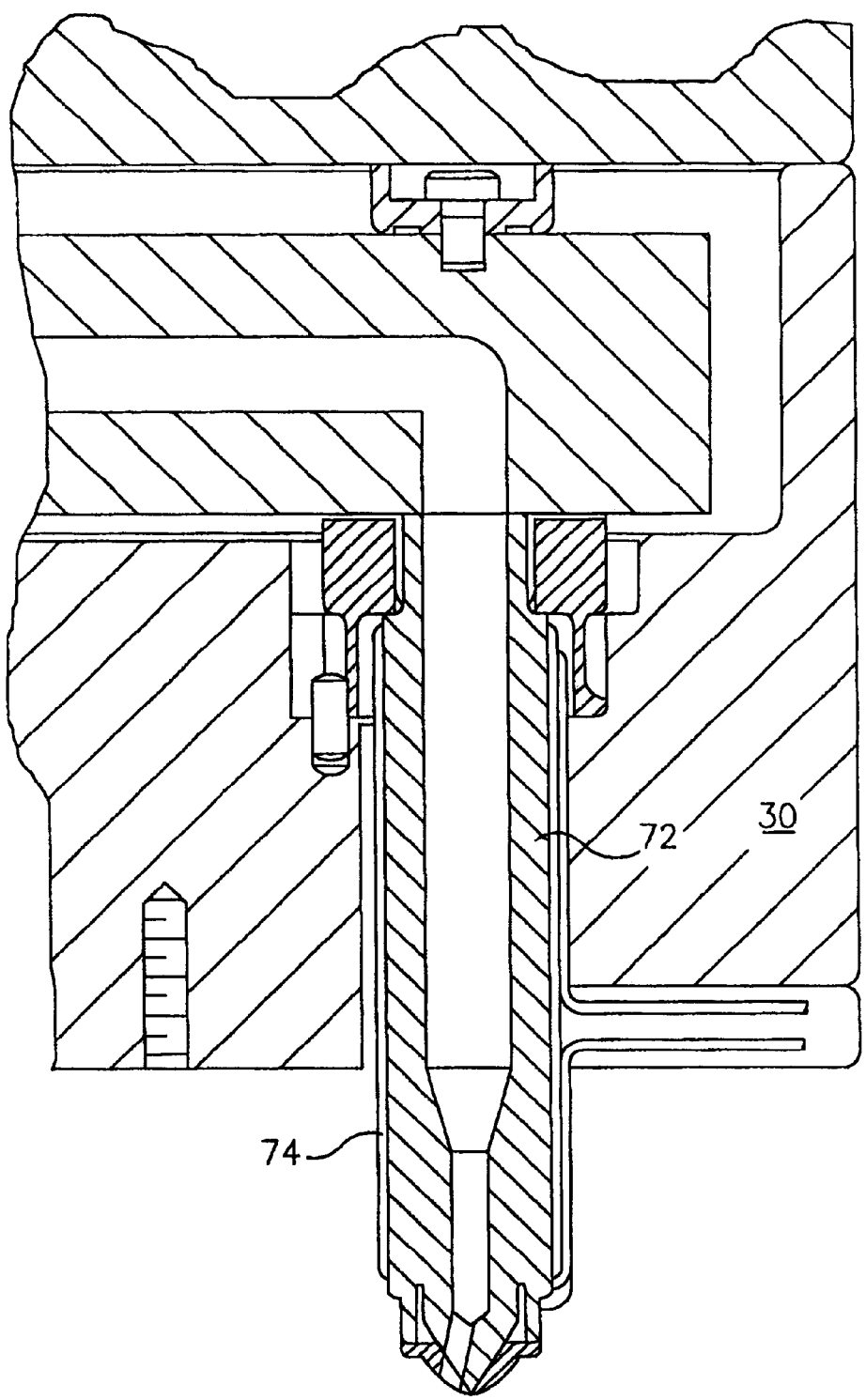

FIG. 4A shows a one piece nozzle body and nozzle tip 72 as in FIG. 3, but including a slip on heater 74. FIG. 4A shows mold cavity plate 36 fixed to manifold plate 30 by screw 38, and FIG. 4B shows the mold cavity plate removed or unlatched for access to and removal of the nozzle body and heater.

Thus, in accordance with the present invention, a nozzle body is provided containing an integral heater that is detachable from the hot runner assembly system in an expeditious and convenient manner without requiring disassembly of the mold structure other than removal of the cavity plate or cavity inserts. In addition, the present invention provides a nozzle assembly containing a nozzle body centering component that remains assembled to the hot runner system when the nozzle body is removed, wherein the nozzle assembly sealing to the hot runner manifold provides a sliding and sealing action. Also, in accordance with the present invention, the nozzle body heater and thermocouple wiring is routed so that the nozzle body can be rotated for removal. In addition, the foregoing features and advantages are simply and conveniently obtained in a highly advantageous structure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for injection molding plastic material, which comprises:

a nozzle assembly through which plastic material flows, said nozzle assembly including a removable nozzle body with a forward end portion, a rearward end portion and a nozzle channel through which said plastic material flows;

heating means affixed to the nozzle body;

a nozzle header adjacent the rearward end portion of the nozzle body;

a mold cavity plate adjacent the forward and portion of the nozzle body and separable from said forward end portion;

a manifold with a manifold channel, with said manifold channel communicating with said nozzle channel, wherein in operation said manifold slides with respect to said nozzle channel and nozzle header, and said nozzle header maintains a centered position of said nozzle body in said mold cavity plate; and wherein separation of the mold cavity plate from the forward end portion of the nozzle body exposes the forward end portion and heating means and permits removal of the nozzle body and heating means from the nozzle assembly.

2. Apparatus according to claim 1, wherein said nozzle body seals against said manifold.

3. Apparatus according to claim 2, wherein said nozzle header is attached to the nozzle body and wherein the nozzle header maintains a nozzle center position in the mold cavity plate, wherein the nozzle header remains in place upon removal of the nozzle body.

4. Apparatus according to claim 2, wherein the nozzle header is attached to the nozzle body and wherein the nozzle header pushes the nozzle body into sealing relationship with said manifold.

5. Apparatus according to claim 1, wherein said nozzle header is between the nozzle body and manifold, wherein the nozzle body is in sealing engagement with the nozzle header and the nozzle header is in sealing engagement with the manifold.

6. Apparatus according to claim 1, wherein the heating means is embedded in the nozzle body.

7. Apparatus according to claim 6, including a thermocouple embedded in said nozzle body.

8. Apparatus according to claim 7, including heater and thermocouple wiring extending from said heater and thermocouple so that said nozzle body can be rotated for removal.

9. Apparatus according to claim 1, including threads on the rearward end portion of said nozzle body for threadably fixing the nozzle body in place.

10. Apparatus according to claim 9, including engagement means on said nozzle body for engagement with a tightening and loosening tool.

11. Apparatus according to claim 1, wherein said nozzle header engages the rearward end portion of the nozzle body, wherein the nozzle body is removable from the nozzle header.

* * * * *

UNITED STATES PATENT AND TRADEMARK OFFICE
CERTIFICATE OF CORRECTION

PATENT NO. : 6,220,851 B1
DATED : April 24, 2001
INVENTOR(S) : Jenko

It is certified that error appears in the above-identified patent and that said Letters Patent is hereby corrected as shown below:

<u>Column 5, claim 1,</u>
Line 9, "and" should read -- end --

Signed and Sealed this

Twenty-fifth Day of December, 2001

Attest:

*Attesting Officer*

JAMES E. ROGAN
*Director of the United States Patent and Trademark Office*